(12) United States Patent
Chontos et al.

(10) Patent No.: US 9,177,488 B2
(45) Date of Patent: Nov. 3, 2015

(54) METHOD, SYSTEM AND PROGRAM PRODUCT FOR SECURING DATA WRITTEN TO A STORAGE DEVICE COUPLED TO A COMPUTER SYSTEM

(75) Inventors: John D. Chontos, Raleigh, NC (US); Edward J. Grenchus, Jr., Vestal, NY (US); David P. Kolsna, Vestal, NY (US); Robert F. Pryor, Lynn Haven, FL (US)

(73) Assignee: International Business Machines Corporation, Armonk, NY (US)

( * ) Notice: Subject to any disclaimer, the term of this patent is extended or adjusted under 35 U.S.C. 154(b) by 1991 days.

(21) Appl. No.: 12/189,765

(22) Filed: Aug. 11, 2008

(65) Prior Publication Data

US 2010/0037063 A1 Feb. 11, 2010

(51) Int. Cl.
| | |
|---|---|
| *G06F 12/14* | (2006.01) |
| *H04L 29/06* | (2006.01) |
| *H04L 9/32* | (2006.01) |
| *G06F 7/04* | (2006.01) |
| *G09C 1/00* | (2006.01) |
| *H04L 9/08* | (2006.01) |
| *G06F 21/10* | (2013.01) |
| *G06F 21/34* | (2013.01) |
| *G11B 20/00* | (2006.01) |

(52) U.S. Cl.
CPC ............... *G09C 1/00* (2013.01); *H04L 9/0894* (2013.01); *G06F 21/10* (2013.01); *G06F 21/34* (2013.01); *G06F 2221/2107* (2013.01); *G11B 20/0021* (2013.01); *H04L 63/0428* (2013.01); *H04L 63/08* (2013.01); *H04L 63/0853* (2013.01); *H04L 2209/12* (2013.01)

(58) Field of Classification Search
CPC ............ G06F 21/10; G06F 2221/2107; G06F 2221/2134; G11B 20/0021; H04L 63/08; H04L 63/0428; H04L 63/0853
USPC .................. 713/193, 165, 168; 726/9, 26
See application file for complete search history.

(56) References Cited

U.S. PATENT DOCUMENTS

| | | | |
|---|---|---|---|
| 6,968,459 B1 | 11/2005 | Morgan et al. | |
| 7,099,110 B2 | 8/2006 | Detzler | |
| 7,257,717 B2 | 8/2007 | Huang | |
| 7,278,016 B1 | 10/2007 | Detrick et al. | |
| 2007/0067647 A1 | 3/2007 | Klein | |
| 2007/0098152 A1 | 5/2007 | Detrick et al. | |
| 2007/0198857 A1* | 8/2007 | Gidalov | ................. 713/193 |
| 2010/0023783 A1* | 1/2010 | Ambady | ................. 713/193 |

* cited by examiner

*Primary Examiner* — Aravind Moorty
(74) *Attorney, Agent, or Firm* — John R. Pivnichny; Law Office of Jim Boice (57) ABSTRACT

A method, system and program product for securing data written to a storage device coupled to a computer system. The method includes providing a detachable data security key device for controlling access to data written to a storage within a computer system and attaching the security key device to the computer system for enabling access to the data written to the storage. Further, the method includes detaching the security key device from the computer system for disabling access to the data written to the storage, wherein removal of the security key device from the computer system renders the data written to the storage unreadable. In an embodiment, the security key device includes an encryption key module coupled to the security key device for encrypting the data written to the storage and includes a decryption key module coupled to the security key device for decrypting the data written to the storage.

9 Claims, 10 Drawing Sheets

METHOD, SYSTEM AND PROGRAM PRODUCT FOR SECURING DATA WRITTEN TO A STORAGE DEVICE COUPLED TO A COMPUTER SYSTEM

FIELD OF THE INVENTION

The present invention relates to computer systems and software, and more specifically to a technique for securing data written to a storage device, such as, a hard drive within a computer system, using a detachable data key or key device.

BACKGROUND OF THE INVENTION

One of the major concerns in product end life management of Information Technology (IT) equipment deals with the security of data and information (personal records, financial data, etc.) contained in a hard drive. Whether the asset is owned or leased, emerging privacy laws can hold businesses responsible for personal, sensitive and business data compromised during usage and at disposal. Data cleansing techniques, which include physical impairment and/or destruction solutions, such as, shredding or pulverization of the hard drives, magnetic degaussing techniques, acid or reactant baths, etc. all have drawbacks. As such, there is a need to effectively secure data and information that is also cost efficient.

SUMMARY OF THE INVENTION

The present invention resides in a system, method and program product for securing data written to a storage device coupled to a computer system. The method includes providing a first detachable data security key device for controlling access to data written to a storage device within a computer system and attaching the first detachable data security key device to the computer system for enabling access to the data written to the storage device within the computer system and detaching the first detachable data security key device from the computer system for disabling access to the data written to the storage device within the computer system, wherein removal of the first detachable data security key device from the computer system renders the data written to the storage device unreadable. In an embodiment, the providing step further includes providing a first encryption key module coupled to the first detachable data security key device for encrypting the data written to the storage device within the computer system and providing a first decryption key module coupled to the first detachable data security key device for decrypting the data written to the storage device within the computer system. In an embodiment, the attaching step further includes utilizing a unique symmetric encryption key provisioned in the first encryption key module coupled to the first detachable data security key device for encrypting the data written to the storage device within the computer system. In an embodiment, the attaching step further includes utilizing a unique symmetric decryption key provisioned in the decryption key module coupled to the first detachable data security key device for decrypting the data written to the storage device within the computer system. Further, in an embodiment, the method includes replacing the first detachable data security key device with a second detachable data security key device, wherein a new unique symmetric encryption key is provided by the second detachable data security key device for writing new data to the computer system, and wherein a new unique symmetric decryption key is provided by the second detachable data security key device for decrypting the new data written to the storage device, and wherein the data written with the first detachable data security key device to the storage device within the computer system is not accessible with the second detachable data security key device. In an embodiment, the storage device within the computer system is either a hard drive, a hard drive controller card, a computer mother board or a solid state drive.

In another aspect the invention provides a computer system for securing data stored therein. The computer system includes a central processing unit and first program instructions to identify a first detachable data control device provided for controlling access to data written to a storage device within the computer system. Further, the computer system includes second program instructions to couple the first detachable data control device to the computer system for enabling access to the data written to the storage device within the computer system and third program instructions to decouple the first detachable data control device from the computer system for disabling access to the data written to the storage device within the computer system, wherein removal of the first detachable data control device from the computer system renders the data written to the storage device within the computer system unreadable, and wherein the first, second and third program instructions are stored in the computer system for execution by the central processing unit. In an embodiment, the computer system further includes fourth program instructions to replace the first detachable data control device in the computer system with a second detachable data control device for writing new data to the computer system, wherein the data written with the first detachable data control device to the storage device within the computer system is rendered unreadable without the first detachable data control device, and wherein the fourth program instructions are stored in the computer system for execution by the central processing unit. In an embodiment, the first program instructions include instructions to provide a first encryption key module coupled to the first detachable data control device for encrypting the data written to the storage device within the computer system. In an embodiment, the first program instructions include instructions to provide a first decryption key module coupled to the first detachable data control device for decrypting the data written to the storage device within the computer system. In an embodiment, the second program instructions include instructions to utilize a unique symmetric encryption key provisioned in the first data encryption module of the first detachable data control device for encrypting the data written to the storage device within the computer system. In an embodiment, the second program instructions include instructions to utilize a unique symmetric decryption key provisioned in the first data decryption module of the first detachable data control device for decrypting the data written to the storage device within the computer system. In an embodiment, each of the first second and third program instructions are stored in the computer system for execution by the central processing unit. In an embodiment, the storage device within the computer system is a hard drive, a hard drive controller card, a computer mother board or a solid state drive.

In yet another aspect, the invention provides a computer program product stored on a computer readable medium for securing data written to a computer system. The computer program product includes first program instructions to identify a first removable data security device for controlling access to data written to a storage device within a computer system and second program instructions to couple the first removable data security device to the computer system for enabling access to the data written to the storage device within the computer system. Further, the computer program product includes third program instructions to decouple the first removable data security device from the computer system for disabling access to the data written to the storage device within the computer system, wherein removal of the first removable data security device from the computer system renders the data written to the storage device unreadable. In an embodiment, each of the first, second and third program instructions are recorded on the computer readable storage medium. The computer program product further includes fourth program instructions to replace the first removable data security device coupled to the computer system with a second removable data security device for writing new data to the computer system, wherein the data written to the storage device within the computer system is rendered unreadable without the first removable data security device. In an embodiment, the first program instructions include instructions to provide a first encryption module within the first removable data security device for encrypting the data written to the storage device within the computer system. In an embodiment, the first program instructions include instructions to provide a first decryption module within the first removable data security device for decrypting the data written to the storage device within the computer system. In an embodiment, the computer the second program instructions include instructions to utilize a unique symmetric encryption key provisioned in the first data encryption module of the first removable data security device for encrypting the data written to the storage device within the computer system. In an embodiment, the second program instructions include instructions to utilize a unique symmetric decryption key provisioned in the first data decryption module of the first removable data security device for decrypting the data written to the storage device within the computer system. In an embodiment, the storage device within the computer system is either a hard drive, a hard drive controller card, a computer mother board or a solid state drive.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1A:
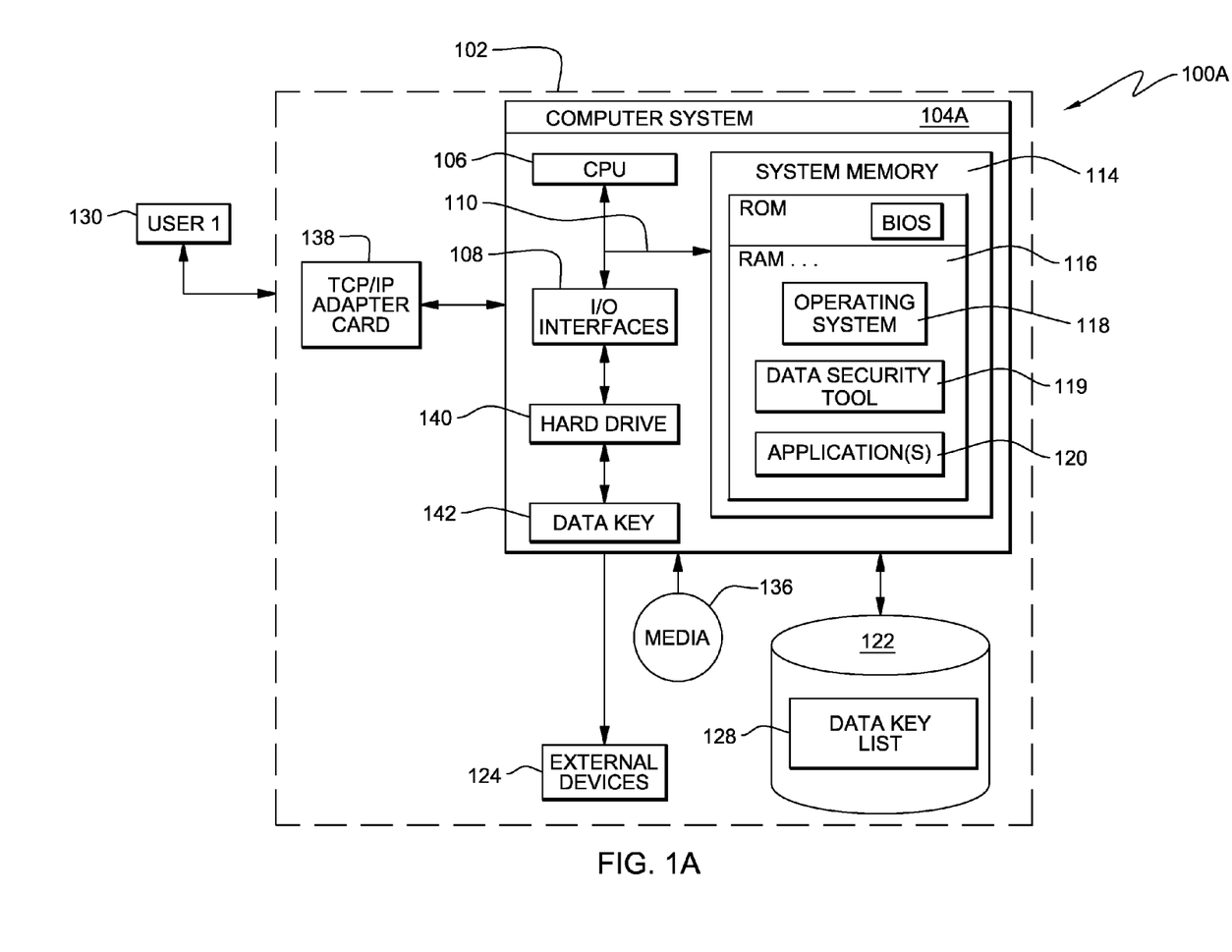
FIG. 1A is a schematic block diagram of a computer infrastructure having a removable or detachable data security device or key device externally coupled to a hard drive or storage device within a computer system for securing data written to the computer system, in accordance with an embodiment of the present invention.
Figure 1B:
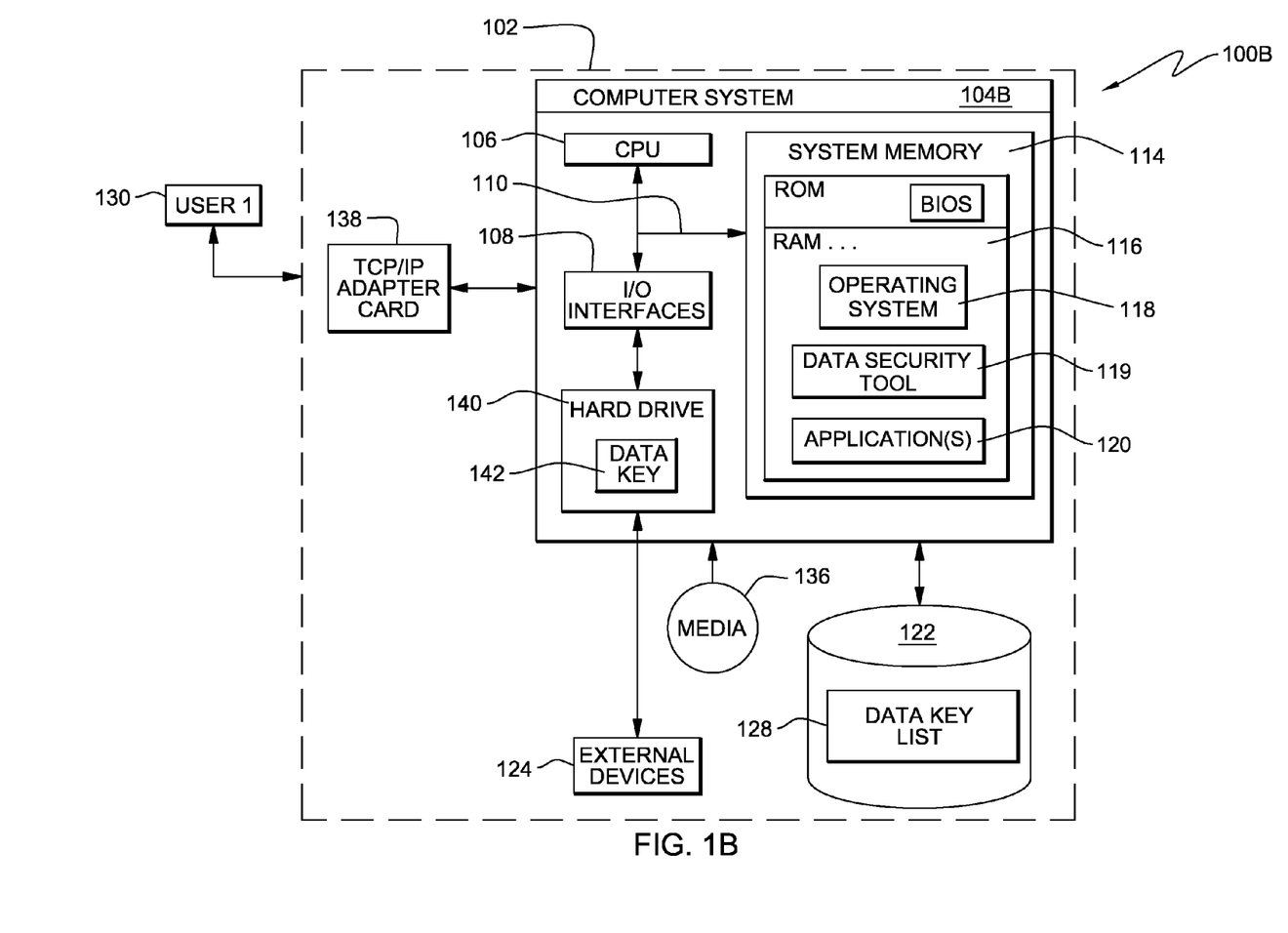
FIG. 1B is a schematic block diagram of a computer infrastructure having a removable or detachable data security device or key device connected to a hard drive or storage device within a computer system for securing data written to the computer system, in accordance with an embodiment of the present invention.

In one embodiment, the invention provides a system for securing data written to or read from a hard drive or storage device or component within a computer system, using a detachable or removable data security key device (also referred to herein as "data security key", "data security device", "data control device", "key device", "data key" and/or simply "key") that is coupled to or connected to a hard drive or storage component within the computer system. Reference is now made to FIGS. 1A and 1B, reference numeral 100A and 100B, respectively, which illustrate embodiments of a computer infrastructure 102 for securing data written to respective computer systems 104A and 104B, using a data key 142 for securing data written to the respective computer systems 104A and 104B. Further, as shown in FIGS. 1A and 1B, the respective computer systems 104A and 104B include a data security tool or code or program 119 loaded onto the respective computer systems 104A and 104B for tracking the one or more data keys 142 that may be connected to a given computer system for securing data, as explained further herein below. Turning to FIGS. 1A and 1B, FIGS. 1A and 1B illustrate respective computer systems 104A and 104B within a computer infrastructure 102, which include a respective detachable data security key or data key 142 for securing data written to a respective hard drive 140 located within respective computer systems 104A and 104B, in accordance with an embodiment of the present invention. As depicted in FIGS. 1A and 1B, computer infrastructure 102, which includes respective computer systems 104A and 104B, is intended to represent any type of computer architecture that is maintained in a secure environment (i.e., for which access control is enforced). It should be understood, however, that although not shown, other hardware and software components (e.g., additional computer systems, routers, firewalls, etc.) could be included in infrastructure 102. Further, as shown in FIGS. 1A and 1B, the respective computer systems 104A and 104B typically represent application servers or computer systems running applications or the like that include a central processing unit (CPU) 106 (hereinafter referred to as "processing unit 106"), a system memory 114, a bus 110, and input/output (I/O) interfaces 108, a hard drive 140 and a detachable data security key or data key 142. In an embodiment, as shown in FIG. 1A, the detachable data key or device 142 is coupled to or connected externally to the hard drive 140 but within computer system 104A, whereas, in another embodiment, shown in FIG. 1B, the detachable data key or device 142 is connected or attached internal to the hard drive 140. Further, the data key 142 comprises an encryption module for encrypting data stored in the hard drive 140 and a decryption module for decrypting data retrieved from the hard drive 140, as discussed further herein below with respect to FIGS. 2A and 2B. In an embodiment, the data security tool or code 119 loaded within a respective computer systems is configured to track a respective data key device 142 that is coupled to a respective hard drive 140 within the respective computer systems, such that, if a respective data key 142 coupled to a respective hard drive 140 is replaced, the respective computer system 104A and/or 104B can track such data key changes in order for a user to be able to access data, that is, store data onto or retrieve data from the computer system, as explained further herein below. Further, each of the computer systems 104A and 104B is shown in communication with external I/O devices/resources 124 and a storage system 122. In general, processing unit 106 executes computer program code, such as, the operating system 118 and other applications 120 residing within RAM (Random Access Memory) 116 of system memory or main memory 114. While executing computer program code, such as, an application 120, the processing unit 106 can read and/or write data to/from memory 114, hard drive 140, storage system 122, and/or I/O interfaces 108. For instance, in one embodiment, the data security tool or code 119 deployed on the respective computer systems 104A and 104B tracks the one or more data keys 142 that may be used by the respective computer system by keeping or storing a data key list 128 written to storage 122. In an embodiment, the data key list 128 provides a list or table identifying a respective detachable data security key or data key device and the respective hard drive or storage component that the data key is attached to within a respective computer system, for instance, computer system 104A and/or 104B. Alternatively, the data key list 128 stored in storage 122 may be stored in a separate storage external to the infrastructure 102. Bus 110 provides a communication link between each of the components in respective computer system 104A and 104B, such that, information can be communicated within the infrastructure 102. External devices 124 can comprise any devices (e.g., keyboard, pointing device, display, etc.) that enable a user to interact with respective computer system 104A and 104B and/or any devices (e.g., network card, modem, etc.) that enable computer system or server 104A and 104B to communicate with one or more other computing devices.

In general, a user 1 at a client (reference numeral 130) may access the respective computer systems 104A and 104B, which has a hard drive 140 that is connected to a detachable data security key or device 142, which implements the invention. A user (at a workstation or using a client device, reference numeral 130) accesses a respective computer system 104A or 104B over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 102 could occur via a direct hard-wired connection (e.g., serial port), or via an addressable connection that may utilize any combination of wired line and/or wireless transmission methods. Moreover, conventional network connectivity, such as, Token Ring, Ethernet, Wi-Fi (Wired Fidelity) or other conventional communications standards could be used. Still yet, connectivity could be provided by conventional TCP/IP sockets-based protocol. In this instance, the parties could utilize an Internet service provider to establish connectivity to infrastructure 102.

Computer infrastructure 102 is only illustrative of various types of computer infrastructures for implementing the invention. For example, in an embodiment shown, computer infrastructure 102 comprises two or more computing devices (e.g., a server cluster) that communicate over a network to perform the various process steps of the invention. Moreover, respective computer systems 100A and 100B are only representative of various possible computer systems that can include numerous combinations of hardware. To this extent, in other embodiments, each of computer systems 100A and 100B can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 114 and/or storage system 122 can comprise any combination of various types of data storage and/or transmission media that reside at one or more physical locations. Further, I/O interfaces 108 can comprise any system for exchanging information with one or more external devices 124. Still further, it is understood that one or more additional components (e.g., system software, math co-processing unit, etc.) can be included in the computer infrastructure 102. Storage system 122 can be any type of system (e.g., a database) capable of providing storage for information under the present invention, such as, the data key list 128. To this extent, storage system 122 could include one or more storage devices, such as a magnetic disk drive or an optical disk drive. In another embodiment, storage system 122 includes data distributed across, for example, a local area network (LAN), wide area network (WAN) or a storage area network (SAN) (not shown). Although not shown, additional components, such as cache memory, communication systems, system software, etc., may be incorporated into computer infrastructure 102.

Figure 2A:
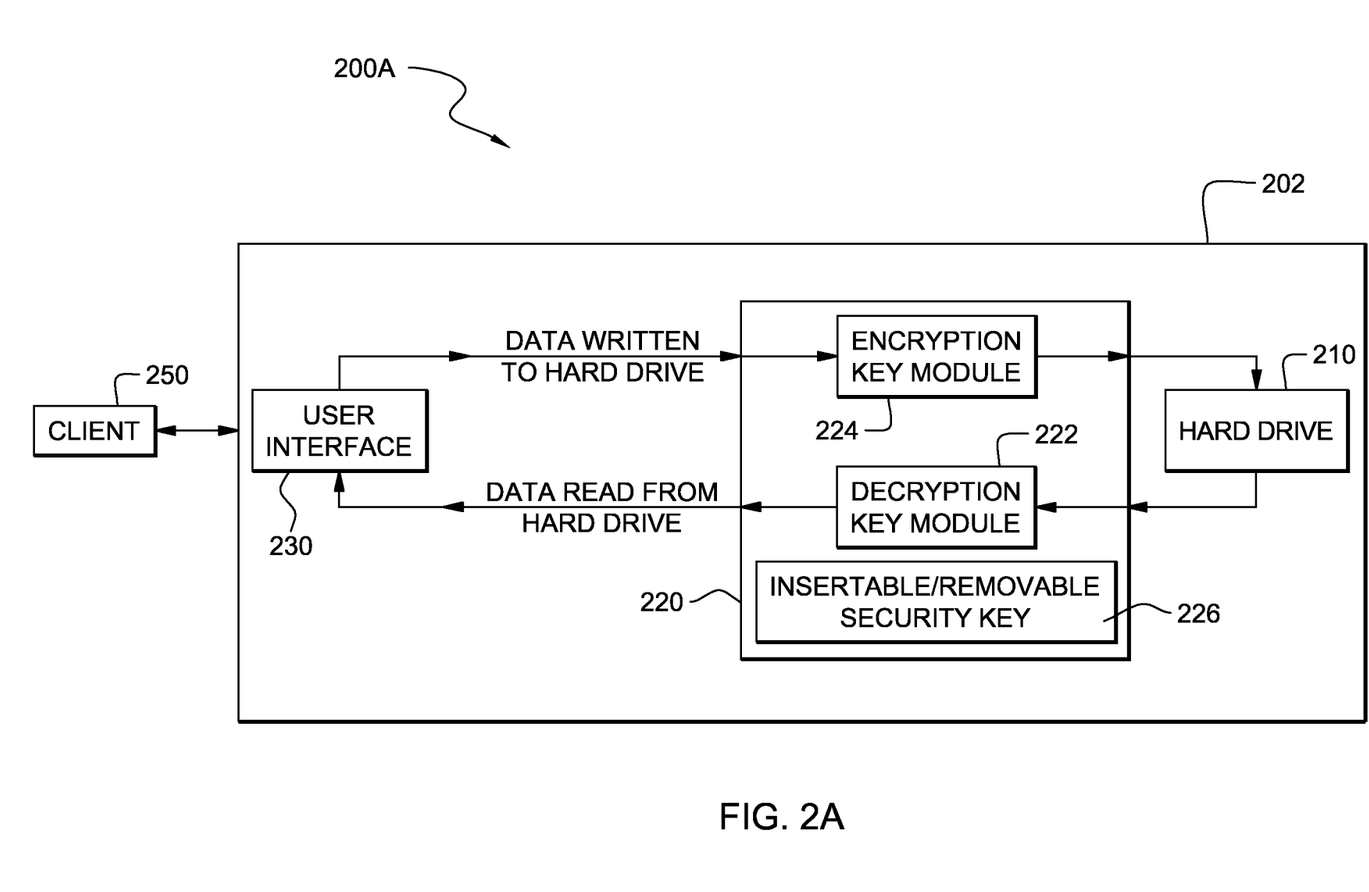
FIG. 2A is a schematic block system diagram illustrating an embodiment of a detachable data security device or key device connected to a hard drive for securing data written to and read from the hard drive, in accordance with an embodiment of the present invention.
Figure 2B:
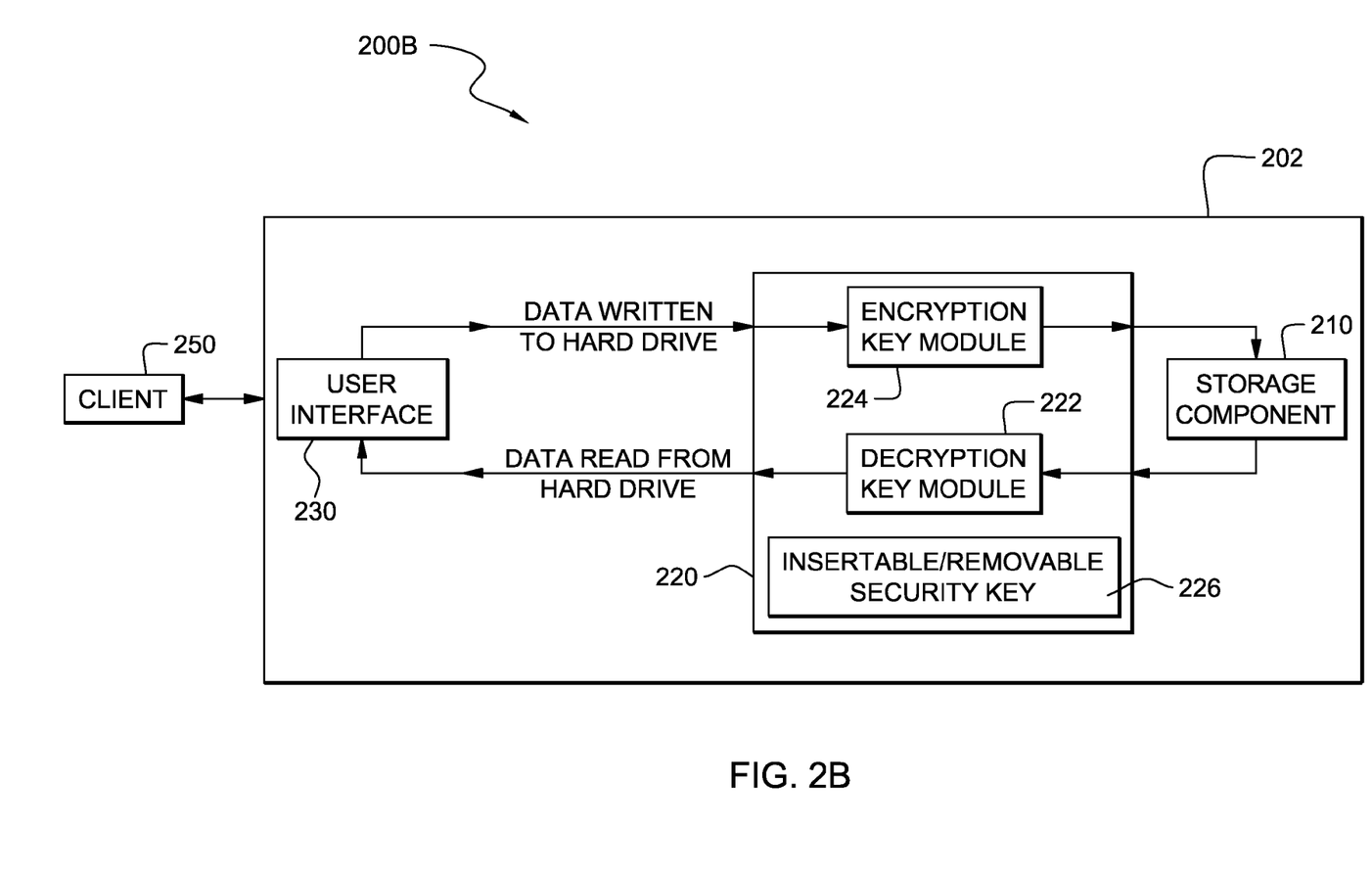
FIG. 2B is a schematic block system diagram illustrating an embodiment of a detachable data security device or key device connected to a storage device or component for securing data written to and read from the storage component, in accordance with an embodiment of the present invention.

Reference is now made to FIGS. 2A and 2B, reference numeral 200A and 200B, respectively, which depict a schematic block system diagram illustrating respective embodiments of a computer system 200A and 200B for securing data written to a hard drive or a storage component within a computer system, in accordance with an embodiment of the invention. In an embodiment, shown in FIG. 2A, the detachable data security key or data key or data key device 226 (shown in FIG. 1A) is configured to secure data that is stored to a hard drive 210 of the computer system 202. In an embodiment shown in FIG. 2A, the data key is an insertable or removable or detachable data security key 226, which is coupled to a controller or controller card 220 connected to the hard drive 210 of the computer system 200A. Further, in an embodiment, the controller or controller card 220 that is coupled to the data key or data security key 226 includes an encryption key module or encryption module 224 for encrypting data stored or written onto the hard drive 210 and a decryption key module or decryption module 222 configured to decrypt data retrieved from the hard drive 210. In an embodiment, the encryption module 224 comprises a low level encryption hardware module or device (such as, a 128 or 256 bit encryption module), which is connected to the hard drive control card and provides unique access to data stored on the hard drive 210. As such, a user at a client device 250 accesses the computer system 202 to write data to or read data from the hard drive 210 using user interface 230. In particular, if the user wishes to write data to the hard drive 210 within computer system 202, the data is first encrypted by the encryption key module or encryption module 224 and then written to the hard drive 210 within computer system 202. Similarly, data stored on the hard drive 210 that a user at a client device 250 wishes to retrieve is first decrypted by the decryption key module 222 within the controller 220 and then the decrypted data is sent to the user interface 230 for display to the user at client 250. Further, in another embodiment shown in FIG. 2B, reference numeral 200B, is configured to secure data that is stored to a storage component 210 of the computer system 202. In an embodiment, shown in FIG. 2B, the data key is an insertable or removable or detachable data security key 226, which in an embodiment, is coupled to a controller or controller card 220 of computer system 200B. Further, in an embodiment shown in FIG. 2B, the controller or controller card 220 further includes an encryption key module or encryption module 224 for encrypting data stored onto the storage component 210 and a decryption key module or decryption module 222 configured to decrypt data retrieved from the storage component 210 within computer system 202. In an embodiment, the decryption module 222 is configured to decrypt the data encrypted using the low level encryption hardware module or device. As such, a user at a client device 250 accesses the computer system 202 to write or read data stored in the storage component 210 within computer system 202 using user interface 230. In particular, if the user is storing data onto computer system 202, the data is first encrypted by the encryption key module 224 and then written to the storage component 210. Similarly, data stored on the storage component 210 that a user at a client device 250 wishes to retrieve is first decrypted using the decryption key module 222 within the controller 220 and then the decrypted data is sent to the user interface 230 for display to the user at client 250.

Figure 3:
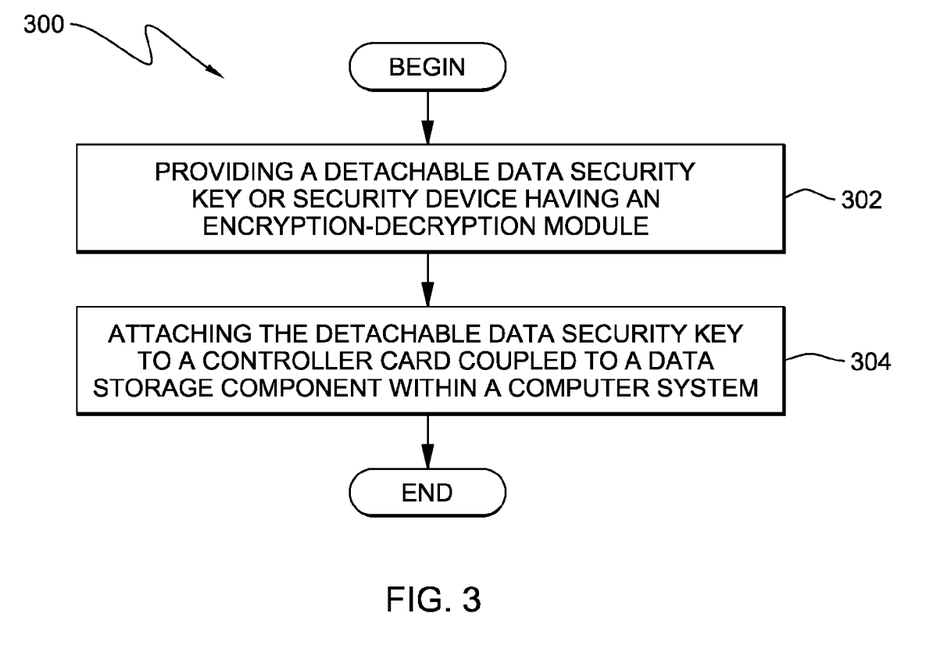
FIG. 3 depicts a flowchart outlining the initial steps performed by a user for securing data stored in a machine or computer system, in accordance with an embodiment of the present invention.
Figure 4:
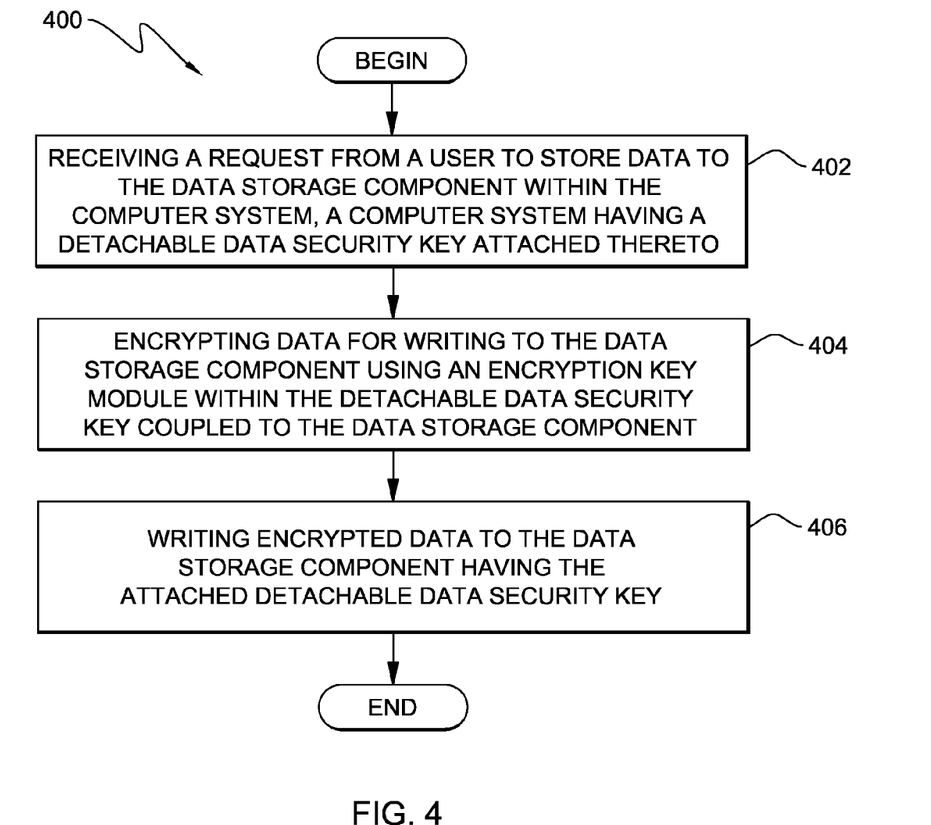
FIG. 4 depicts a flowchart outlining the steps of securing data stored in a machine or computer system having a detachable data security key or key device, in accordance with an embodiment of the present invention.
Figure 5:
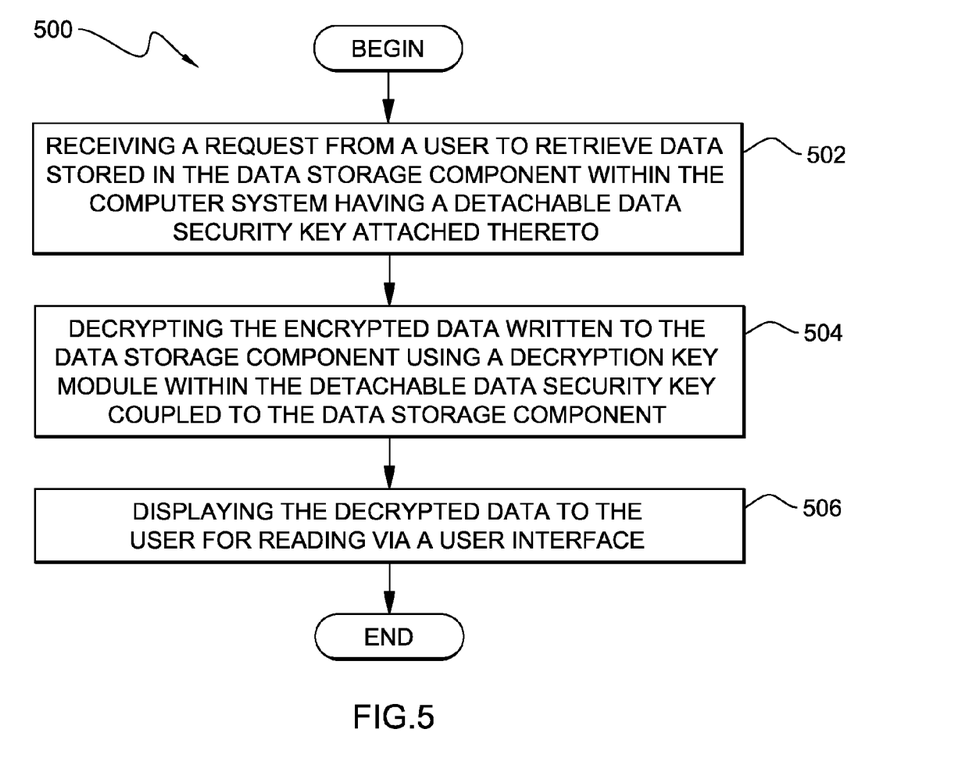
FIG. 5 depicts a flowchart outlining the steps of accessing data stored in a machine or computer system having a detachable data security key or key device, in accordance with an embodiment of the present invention.

In another aspect, the invention provides a method for securing data written to or read from a computer system, using a detachable data security key or device that may is coupled to or connected to a hard drive or storage component within the computer system. Reference is now made to FIGS. 3-5, which show different embodiments of a method for securing data written to or read from a computer system. Turning to FIG. 3, reference numeral 300, outlines initial steps performed by a user or administrator for securing data to be stored in a machine or computer system, in accordance with an embodiment of the present invention. The process begins with providing in step 302 a detachable data security key or security device that includes an encryption-decryption module for use with a computer system. Further, in step 304, the process continues with attaching or installing the detachable data security key onto a controller card that is coupled to or connected to a data storage component or hard drive within the computer system, ending the process.

Reference is now made to FIG. 4, reference numeral 400, which depicts a flowchart outlining the steps performed by the detachable data security key or device connected to the computer system for securing data to be stored in a machine or computer system having a detachable data security key or security device installed thereon, in accordance with an embodiment of the present invention. The process starts with step 402 where the data security key or device connected to the computer system receives a request from a user wishing to store data to the data storage component or hard drive within the computer system having a detachable data security key attached thereto for securing data stored or written to the data storage component or hard drive within the computer system. In step 404, a data encryption key module within or coupled to the data security key or device encrypts the data to be written to the data storage component or hard drive within the computer system having the attached detachable data security key, ending the process. Further, in step 406, the encryption key module writes encrypted data to the data storage component having the detachable or removable data security key or device, ending the process.

Reference is now made to FIG. 5, reference numeral 500, which depicts a flowchart outlining the steps performed by the detachable data security key or device connected to the computer system for retrieving or accessing data stored in a machine or computer system having a detachable security key or security device installed thereon, in accordance with an embodiment of the present invention. The process starts with step 502 where the data security key or device connected to the computer system receives a request from a user wishing to access or retrieve data stored in the data storage component or hard drive within the computer system having a detachable data security key attached thereto. In step 504, a data decryption key module within or coupled to the data security key or device decrypts the data to be retrieved or read from the data storage component or hard drive within the computer system having the attached detachable data security key. The decrypted data retrieved from the data storage component is displayed in step 506 to the user via the user interface for reading by the user, ending the process.

Figure 6:
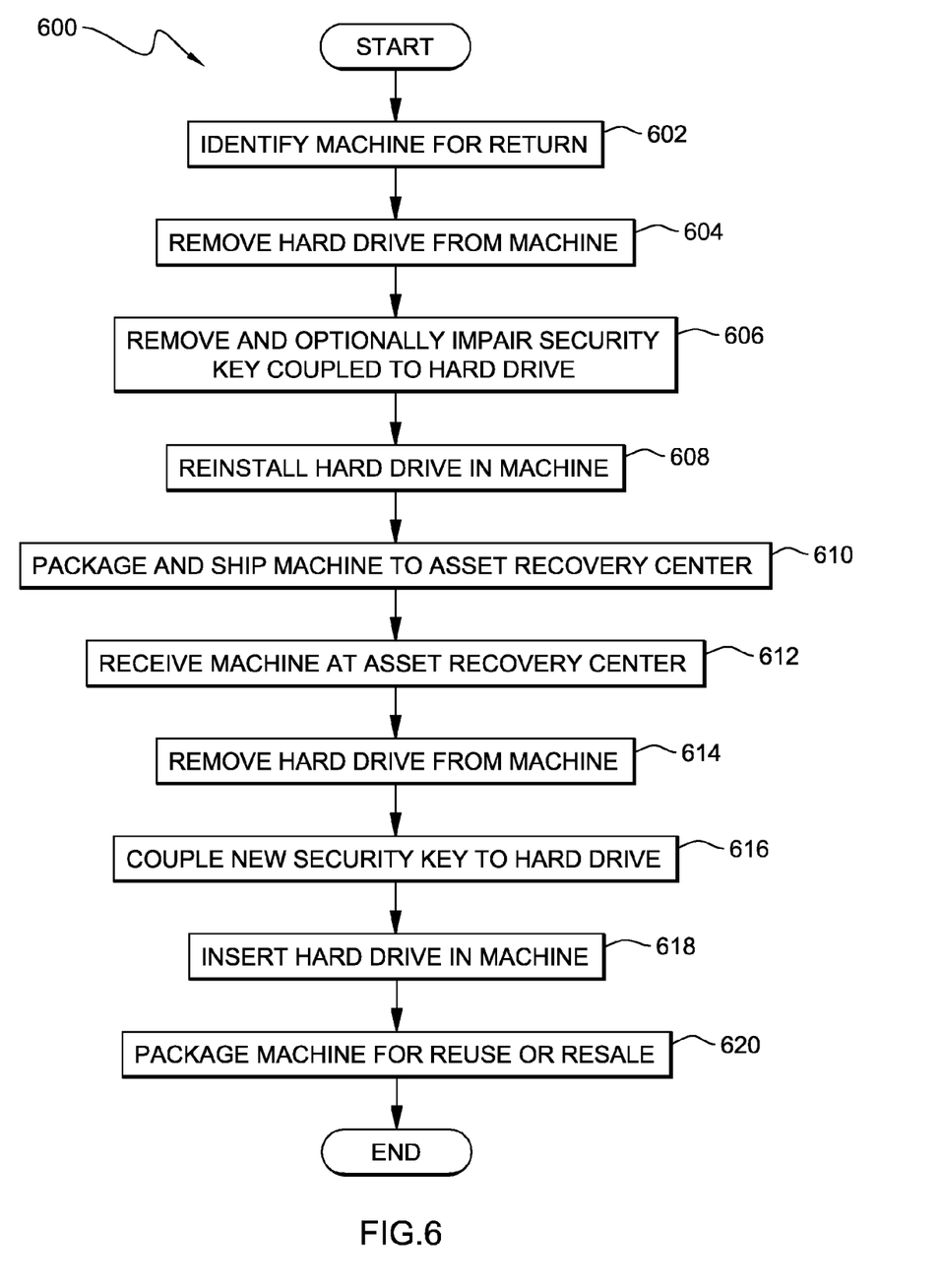
FIG. 6 depicts a flowchart outlining the steps performed by an asset recovery center system for securing data in a storage device or hard drive located within a computer system in order to recycle or reuse the computer system, in accordance with an embodiment of the present invention.
Figure 7:
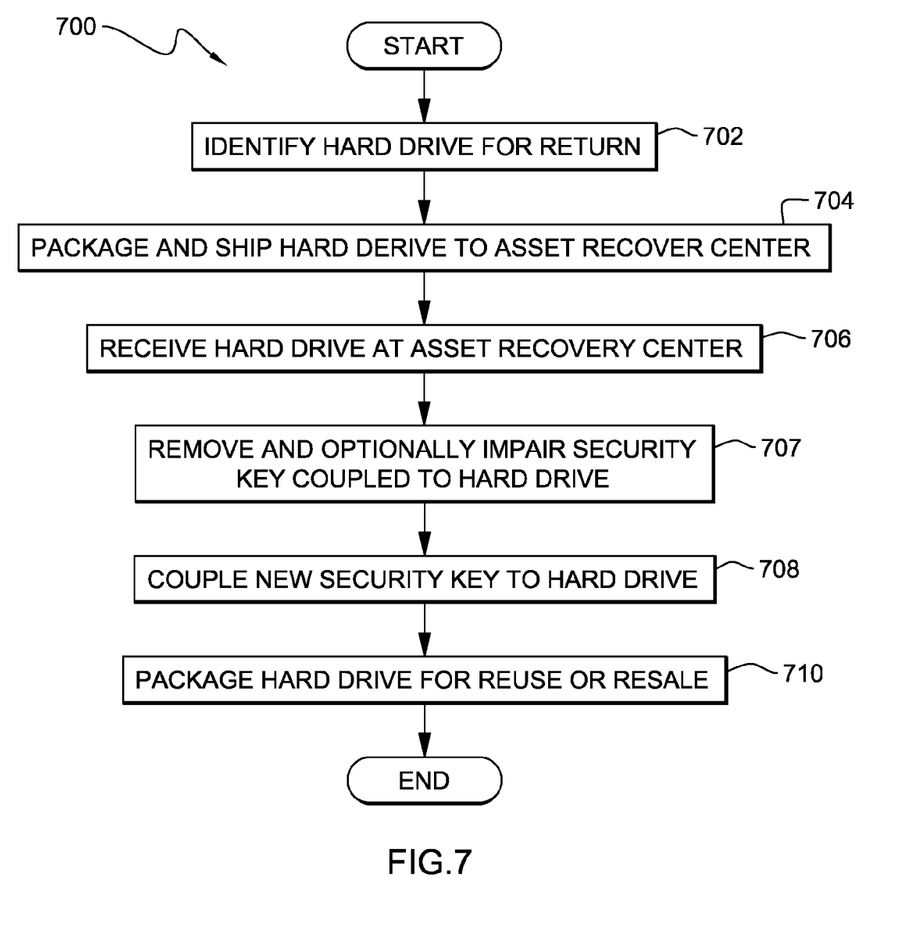
FIG. 7 depicts a flowchart outlining the steps performed by an asset recovery center system for securing data in a hard drive or storage device within a computer system in order to recycle or reuse the hard drive or storage device, in accordance with an embodiment of the present invention.

In yet another embodiment, the invention provides a method for reusing or recycling a computer system containing a detachable data security key or device connected to or coupled to a hard drive or storage component within the computer system for securing access to any data stored on the hard drive or storage component. Further, the invention provides a method for reusing or recycling a hard drive or storage component associated with a detachable data security key or device for securing data stored onto the hard drive or storage component. Reference is now made to FIGS. 6 and 7, where FIG. 6 outlines steps for reusing or recycling a computer system having a detachable data security key or device coupled to the hard drive, whereas, FIG. 7 outlines steps for reusing or recycling a hard drive or storage component for securing access to the hard drive or storage component itself. Turning to FIG. 6, the process of reusing or recycling a computer system for reuse or resale begins with step 602, where the data security tool or code installed on an inventory tracking machine or computer system, identifies a machine or computer system to be recycled or reused. In step 604, the hard drive is removed from the machine or computer system. Further, in step 606, the data security key or device coupled to the hard drive is removed or detached from the hard drive. Optionally, the data security key or device is impaired or destroyed. The hard drive without the detachable security key or device is reinstalled in step 608 into the machine or computer system. The machine or computer system with the reinstalled hard drive (without the detachable data security key or device) is packaged and shipped to an asset recovery center. The machine or computer system is received in step 612 at the asset recovery center. The hard drive is removed in step 614 from the machine or computer system. In step 616, a new detachable data security key or device is coupled or attached to the hard drive and the hard drive containing the new detachable data security key or device is inserted back into the machine or computer system in step 618. Further, in step 620, the computer system with the hard drive containing the new detachable data security key or device is packaged for reuse or resale, ending the process.

Turning to FIG. 7, the process of reusing or recycling a hard drive or storage component for reuse or resale begins with step 702, where the data security tool or code installed on an inventory tracking machine or computer system, identifies a hard drive or storage component to be recycled or reused. In step 704, the hard drive or storage component is packaged and shipped to an asset recovery center. The asset recovery center receives the hard drive in step 706. Further, in step 707, the data security key or device coupled to the hard drive or storage component is removed or detached from the hard drive. Optionally, the data security key or device is impaired or destroyed. In step 708, a new detachable data security key or device is coupled to the hard drive or storage component. The hard drive or storage component containing the new detachable data security key or device is packaged in step 710 for reuse or resale.

Figure 8:
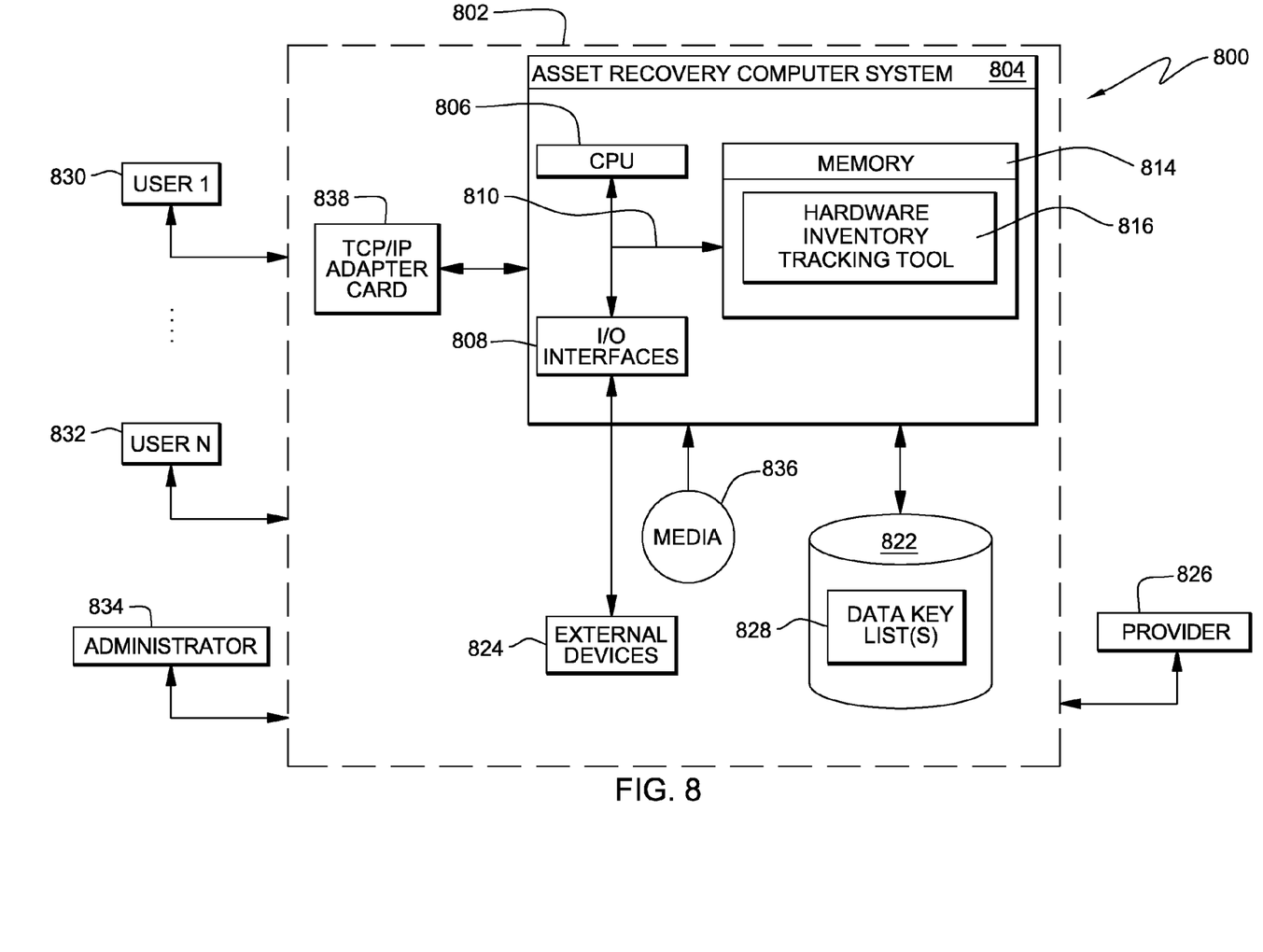
FIG. 8 is a schematic block diagram of an asset recovery computer infrastructure having a hardware inventory tracking tool for reusing or recycling assets containing data, in accordance with an embodiment of the present invention.

Further, in yet another embodiment, the invention provides a computer program product for tracking assets containing data that are to be reused or recycled, such as, a hard drive or a storage component within a computer system and/or the computer system or server itself. Reference is now made to FIG. 8, reference numeral 800, which illustrates an embodiment of an asset recovery computer infrastructure 802 for tracking assets to be reused or recycled, such as, a hard drive or a storage component within a computer system and/or the computer system or server itself, in accordance with an embodiment of the invention. Turning to FIG. 8, FIG. 8 illustrates an asset recovery computer infrastructure 802, which includes a computer program product, namely, a hardware inventory tracking tool 816 for tracking assets that are to be reused or recycled. As depicted in FIG. 8, computer infrastructure 802, includes an asset recovery computer system 804 intended to represent any type of computer architecture that is maintained in a secure environment (i.e., for which access control is enforced). It should be understood, however, that although not shown, other hardware and software components (e.g., additional computer systems, routers, firewalls, etc.) could be included in infrastructure 802. Further, as shown in FIG. 8, the asset recovery computer system 804 typically represent application servers or systems or the like that include a central processing unit (CPU) 806 (hereinafter referred to as "processing unit 806"), a main memory 814, a bus 810, and input/output (I/O) interfaces 808. Further, the asset recovery computer system 804 is shown in communication with external I/O devices/resources 824 and a storage system 822. In general, processing unit 806 executes computer program code, such as, the hardware inventory tracking tool 816 loaded in main memory 814. While executing computer program code, such as, the hardware inventory tracking tool 816, the processing unit 806 can read and/or write data to/from memory 814, storage system 822, and/or I/O interfaces 808. For instance, in one embodiment, the hardware inventory tracking tool 816 stores one or more data key list(s) 828 in storage 822. In an embodiment, a data key list 828 provides a list of data keys or key devices that are attached to corresponding hard drives within respective computer systems, for instance, computer system 104A and 104B, shown in FIGS. 1A and 1B herein above. Alternatively, the data key list(s) 828 may be stored in a separate storage external to the asset recovery computer system 804. Bus 810 provides a communication link between each of the components in the asset recovery computer system 804, such that, information can be communicated within the infrastructure 802. External devices 824 can comprise any devices (e.g., keyboard, pointing device, display, etc.) that enable a user to interact with the asset recovery computer system 804 and/or any devices (e.g., network card, modem, etc.) that enable asset recovery computer system or server 804 to communicate with one or more other computing devices.

The computer program product comprises a computer readable or computer-usable storage medium, which provides program code, such as, the hardware inventory tracking tool 816 for tracking assets to be recycled or reused. The hardware inventory tracking tool 816 can be loaded into the asset recovery computer system 804 from a computer readable media 836, such as, a magnetic tape or disk, optical media, DVD, memory stick, semiconductor memory, etc. or downloaded from the Internet via a TCP/IP adapter card 838.

In general, user 1 (at client device 1, reference numeral 830) through user N (at client device N, reference numeral 832) may access the asset recovery computer system 804, which has deployed thereon the hardware inventory tracking tool 816, which implements the invention. A user (user 1, at client device 1, reference numeral 830 through user N at client device N, reference numeral 832) accesses the asset recovery computer system 804 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 802 could occur via a direct hard-wired connection (e.g., serial port), or via an addressable connection that may utilize any combination of wired line and/or wireless transmission methods. Moreover, conventional network connectivity, such as Token Ring, Ethernet, Wi-Fi (Wired Fidelity) or other conventional communications standards could be used. Still yet, connectivity could be provided by conventional TCP/IP sockets-based protocol. In this instance, the parties could utilize an Internet service provider to establish connectivity to infrastructure 802. It should be understood that under the present invention, infrastructure 802 could be owned and/or operated by a party such as a provider 826, or by an independent entity. Regardless, use of infrastructure 802 and the teachings described herein could be offered to the parties on a subscription or fee-basis. In either scenario, an administrator at client 834 could support and configure infrastructure 802, for instance, upgrading the hardware inventory tracking tool 816 deployed on the asset recovery computer system 804.

Computer infrastructure 802 is only illustrative of various types of computer infrastructures for implementing the invention. For example, in an embodiment shown, computer infrastructure 802 comprises two or more computing devices (e.g., a server cluster) that communicate over a network to perform the various process steps of the invention. Moreover, computer system 800 is only representative of various possible computer systems that can include numerous combinations of hardware. To this extent, in other embodiments, the computer system 800 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 806 may comprise a single processing unit, or be distributed across one or more processing units in one or more locations, e.g., on a client and server. Similarly, memory 814 and/or storage system 822 can comprise any combination of various types of data storage and/or transmission media that reside at one or more physical locations. Further, I/O interfaces 808 can comprise any system for exchanging information with one or more external devices 824. Still further, it is understood that one or more additional components (e.g., system software, math co-processing unit, etc.) not shown in FIG. 8 can be included in the computer infrastructure 802. Storage system 822 can be any type of system (e.g., a database) capable of providing storage for information under the present invention, such as, the data key list(s) 828. To this extent, storage system 822 could include one or more storage devices, such as a magnetic disk drive or an optical disk drive. In another embodiment, storage system 822 includes data distributed across, for example, a local area network (LAN), wide area network (WAN) or a storage area network (SAN) (not shown). Although not shown, additional components, such as cache memory, communication systems, system software, etc., may be incorporated into computer infrastructure 802.

Accordingly, the invention provides a detachable or removable, low level encryption (such as, a 128 or 256 bit) hardware device (or data key) connected to a hard drive control card or controller that provides unique access to data stored on to a hard drive or storage component coupled to a computer system. The device (or data key) translates (encrypt) all data being written onto the hard drive and translates (decrypt) data being retrieved from the hard drive. As such, the data key controls access to the data on the hard drive, given that removal of the data key secures all the data on the hard drive from recovery and given that the data can only be decrypted (translated) using the unique key provided by the data key. As such, data is prevented from being compromised as it only can be decrypted (translated) using the unique key provided. The hardware device (data security key) may be externally or internally attached to the hard drive, such that, the data security key can be removed or detached. Further, the hardware device (or data key) may be designed as an integral part of the data input function circuitry, so that all data being written onto the hard drive is encrypted. For instance, the data key may be part of the drive BIOS code so that the drive is physically the same as current drives. Further, the encryption process can be hosted in a separate device that resides between the hard drive and the computer system connected to the hard drive, in which case, the encryption module is integral to the separate security device or key. Further yet, the encryption module can be part of the disk controller card, along with the encryption key or module. Further, in an embodiment, the removed data key or device can be impaired or destroyed as part of the removal process. The insertion of a new data key effectively resets the hard drive to an unformatted state, allowing the hard drive to be overwritten with new data. In one embodiment, the computer has a unique data key or device attached to the hard drive control card at the point of manufacture. As such, the computer functions normally with encryption and decryption of data occurring automatically and unobservable to a user. When the computer is resold or discarded, the device is removed from the hard drive control card, rendering all data on the hard drive useless. The hard drive whose data has been secured using a data key can be detected visually, using a tracking system to see what data key is on what drive or by using a sticker attached to a data key that shows date and/or time of data key replacement. Moreover, the hard drive may be reused in its entirety with the addition of a new data key, since a new data key would allow a user to simply overwrite newly encrypted data onto the same hard drive. Even if it is decided that the hard drive will not be reused in its entirety, recovery and reclamation of the hard drive printed circuit card, components and base materials is made easier as such parts are not physically damaged.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for securing data written to a computer system, said method comprising the steps of:
   providing a first detachable data security key device for controlling access to data written to a storage device within a computer system, wherein said providing comprises providing a first encryption key module coupled to said first detachable data security key device for encrypting said data written to said storage device within said computer system and providing a first decryption key module coupled to said first detachable data security key device for decrypting said data written to said storage device within said computer system;
   attaching said first detachable data security key device to said computer system for enabling access to said data written to said storage device within said computer system;
   utilizing a unique symmetric encryption key provisioned in said first encryption key module in said first detachable data security key device for encrypting said data written to said storage device within said computer system;
   utilizing a unique symmetric decryption key provisioned in said first decryption key module in said first detachable data security key device for decrypting said data written to said storage device within said computer system;
   in response to receiving a first request from a first user to store data in the storage device within the computer system, the computer system utilizing the first detachable data security key device to first encrypt data into encrypted data before writing the encrypted data to the storage device within the computer system, wherein all data being written to the storage device is first encrypted before being written to the storage device;
   in response to receiving a second request from a second user to retrieve the encrypted data, the computer system utilizing the first detachable data security key device to decrypt the encrypted data into decrypted data, wherein the first detachable data security key device controls access to all data on the storage device;
   replacing said first detachable data security key device with a second detachable data security key device, wherein a new unique symmetric encryption key is provided by said second detachable data security key device for writing new data to said storage device within said computer system, and wherein a new unique symmetric decryption key is provided by said second detachable data security key device for decrypting said new data written to said storage device, and wherein said data written with said first detachable data security key device to said storage device within said computer system is not accessible with said second detachable data security key device, and wherein replacing said first detachable data security key device with said second detachable data security key device effectively resets the storage device to an unformatted state that allows the storage device to be overwritten with new data and
   displaying the decrypted data to the second user via a user interface.

2. The method according to claim 1, wherein said storage device within said computer system comprises at least one of: a hard drive, a hard drive controller card, a computer mother board and a solid state drive.

3. The method of claim 1, further comprising:
   removing the storage device from the computer system;
   destroying the first detachable data security key device;
   reinstalling the storage device without the first detachable data security key device in another computer system; and
   shipping said another computer system with the storage device and without the first detachable data security key device to an asset recovery center, wherein the storage device is recycled without allowing access to prior data that was stored on the storage device.

4. The method of claim 1, wherein the storage device is a hard drive, and wherein the method further comprises:
   utilizing a tracking system to track which detachable data security key device is coupled to a specific hard drive.

5. The method of claim 1, further comprising:
   affixing a sticker to the second detachable data security key device, wherein the sticker shows a date and time that said first detachable data security key device was replaced by said second detachable data security key device.

6. A computer system for securing data stored therein, said computer system comprising:
   a central processing unit;
   first program instructions to identify a first detachable data control device for controlling access to data written to a storage device within said computer system, wherein said first detachable data control device comprises a first encryption key module for encrypting said data written to said storage device within said computer system, and wherein said first detachable data control device comprises a first decryption key module for decrypting said data written to said storage device within said computer system;
   second program instructions to couple said first detachable data control device to said computer system for enabling access to said data written to said storage device within said computer system, wherein said first detachable data control device comprises a unique symmetric encryption key and a unique symmetric decryption key for encrypting and decrypting said data written to said storage device within said computer system;
   third program instructions to receive a first request from a first user to store data in the storage device within the computer system;
   fourth program instructions to utilize the first detachable data control device to first encrypt data into encrypted data before writing the encrypted data to the storage device within the computer system, wherein all data being written to the storage device is first encrypted before being written to the storage device;
   fifth program instructions to receive a second request from a second user to retrieve the encrypted data by utilizing the first detachable data control device to decrypt the encrypted data into decrypted data, wherein the first detachable data control device controls access to all data on the storage device;
   sixth program instructions to replace said first detachable data control device with a second detachable data control device, wherein a new unique symmetric encryption key is provided by said second detachable data control device for writing new data to said storage device within said computer system, and wherein a new unique symmetric decryption key is provided by said second detachable data control device for decrypting said new data written to said storage device, and wherein said data written with said first detachable data control device to said storage device within said computer system is not accessible with said second detachable data control device, and wherein replacing said first detachable data control device with said second detachable data control device effectively resets the storage device to an unformatted state that allows the storage device to be overwritten with new data; and seventh program instructions to display the decrypted data to the second user via a user interface; and wherein said first, second, third, fourth, fifth, sixth, and seventh program instructions are stored in said computer system for execution by said central processing unit.

7. The computer system according to claim 6, wherein said storage device within said computer system comprises at least one of: a hard drive, a hard drive controller card, a computer mother board and a solid state drive.

8. A computer readable medium used for securing data written to a computer system, wherein stored on said computer readable medium are:

first program instructions to identify a first removable data security device for controlling access to data written to a storage device within a computer system, wherein said first removable data security device comprises a first encryption key module coupled for encrypting said data written to said storage device within said computer system, and wherein said first removable data security device comprises a first decryption key module coupled for decrypting said data written to said storage device within said computer system;

second program instructions to couple said first removable data security device to said computer system for enabling access to said data written to said storage device within said computer system, wherein said first removable data security device comprises a unique symmetric encryption key and a unique symmetric decryption key for encrypting and decrypting said data written to said storage device within said computer system;

third program instructions to receive a first request from a first user to store data in the storage device within the computer system; and fourth program instructions to utilize the first removable data security device to first encrypt data into encrypted data before writing the encrypted data to the storage device within the computer system, wherein all data being written to the storage device is first encrypted before being written to the storage device;

fifth program instructions to receive a second request from a second user to retrieve the encrypted data by utilizing the first removable data security device to decrypt the encrypted data into decrypted data, wherein the first removable data security device controls access to all data on the storage device;

sixth program instructions to replace said first removable data security device with a second removable data security device, wherein a new unique symmetric encryption key is provided by said second removable data security device for writing new data to said storage device within said computer system, and wherein a new unique symmetric decryption key is provided by said second removable data security device for decrypting said new data written to said storage device, and wherein said data written with said first removable data security device to said storage device within said computer system is not accessible with said second removable data security device, and wherein replacing said first removable data security device with said second removable data security device effectively resets the storage device to an unformatted state that allows the storage device to be overwritten with new data; and seventh program instructions to display the decrypted data to the second user via a user interface.

9. The computer readable medium according to claim 8, wherein further stored on said computer readable medium are:

eighth program instructions to replace said first removable data security device coupled to said computer system with a second removable data security device for writing new data to said computer system, wherein said data written to said storage device within said computer system is rendered unreadable without said first removable data security device.

\* \* \* \* \*